June 7, 1932. S. H. CAPELIS 1,861,491
AIRCRAFT
Filed Oct. 13, 1930 3 Sheets-Sheet 3
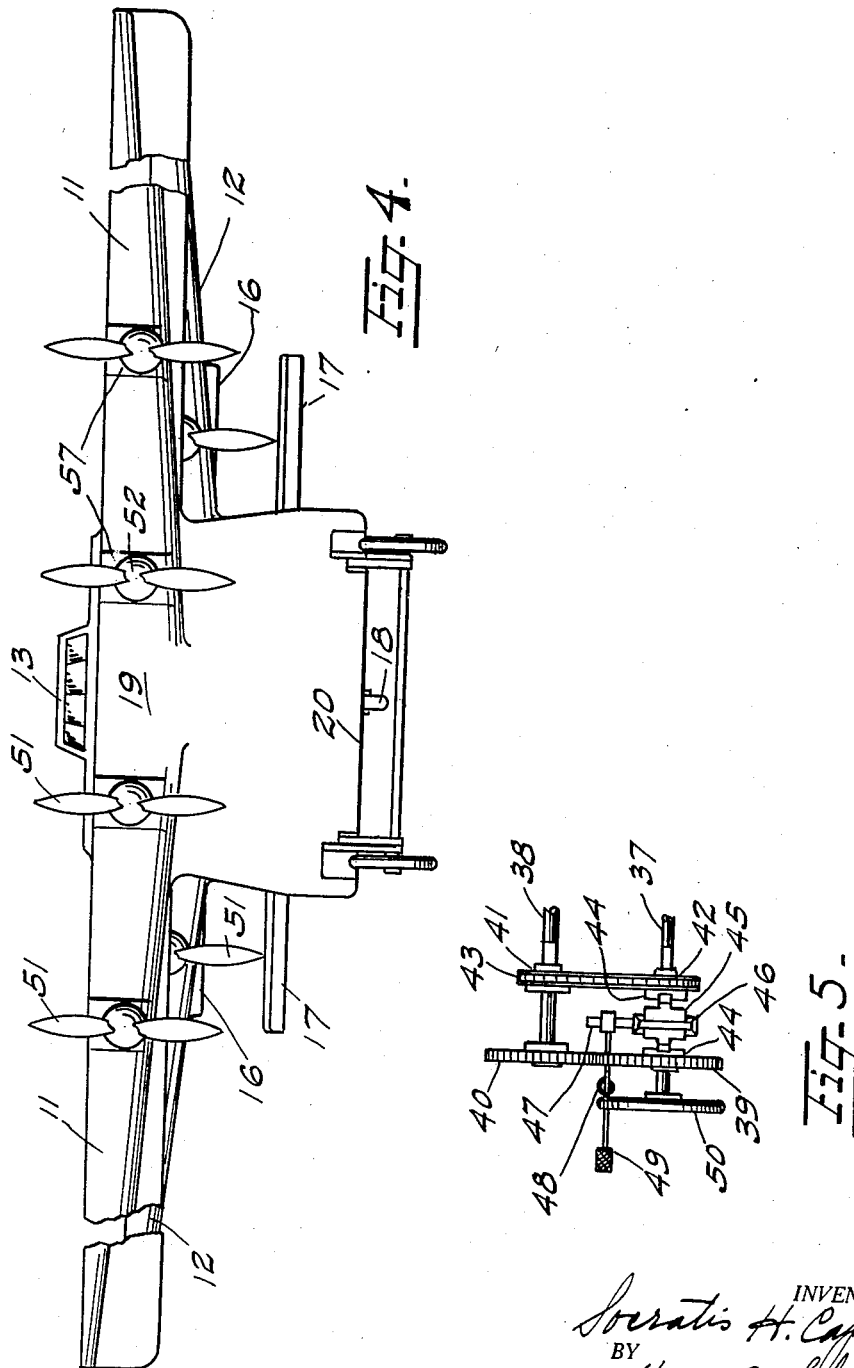

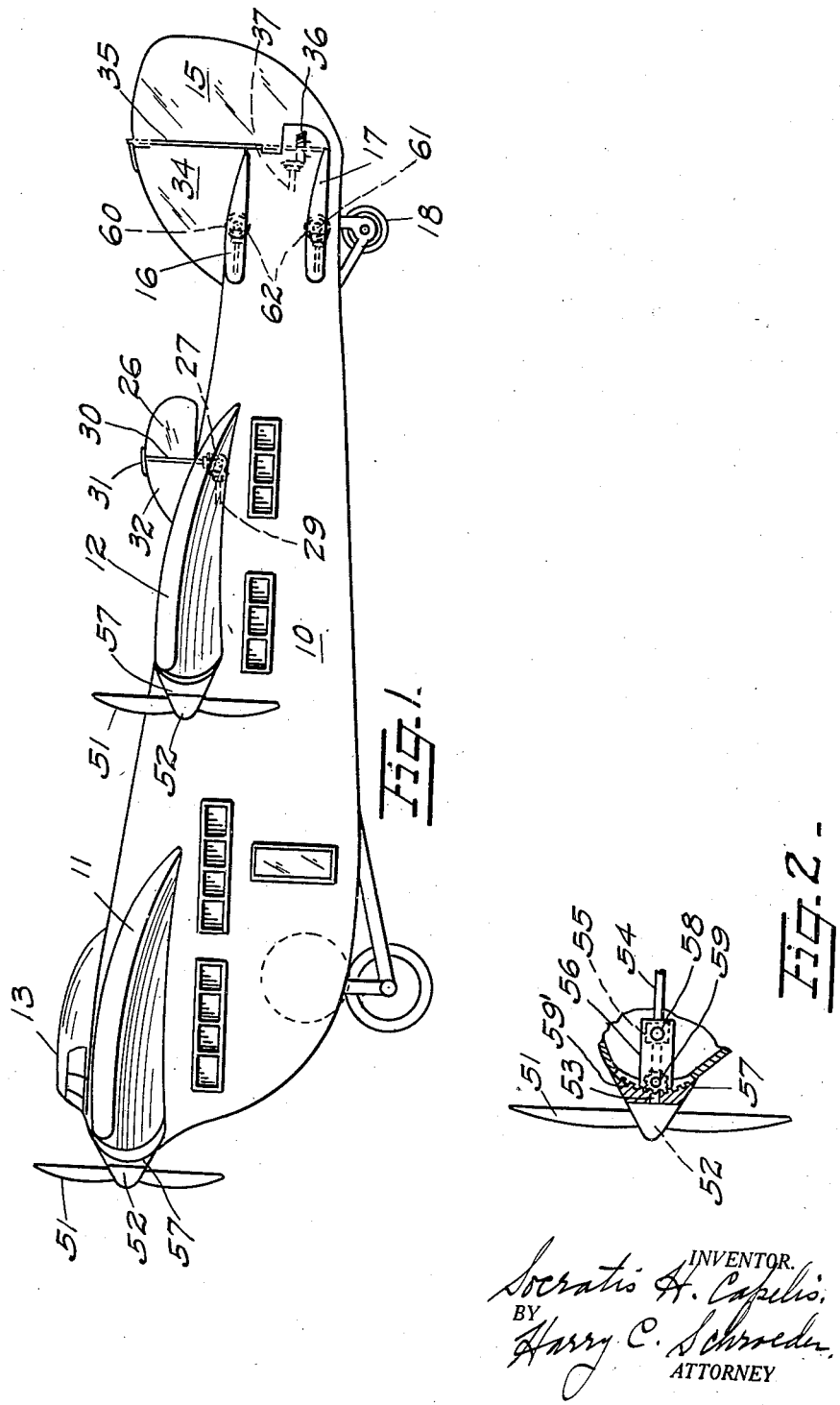

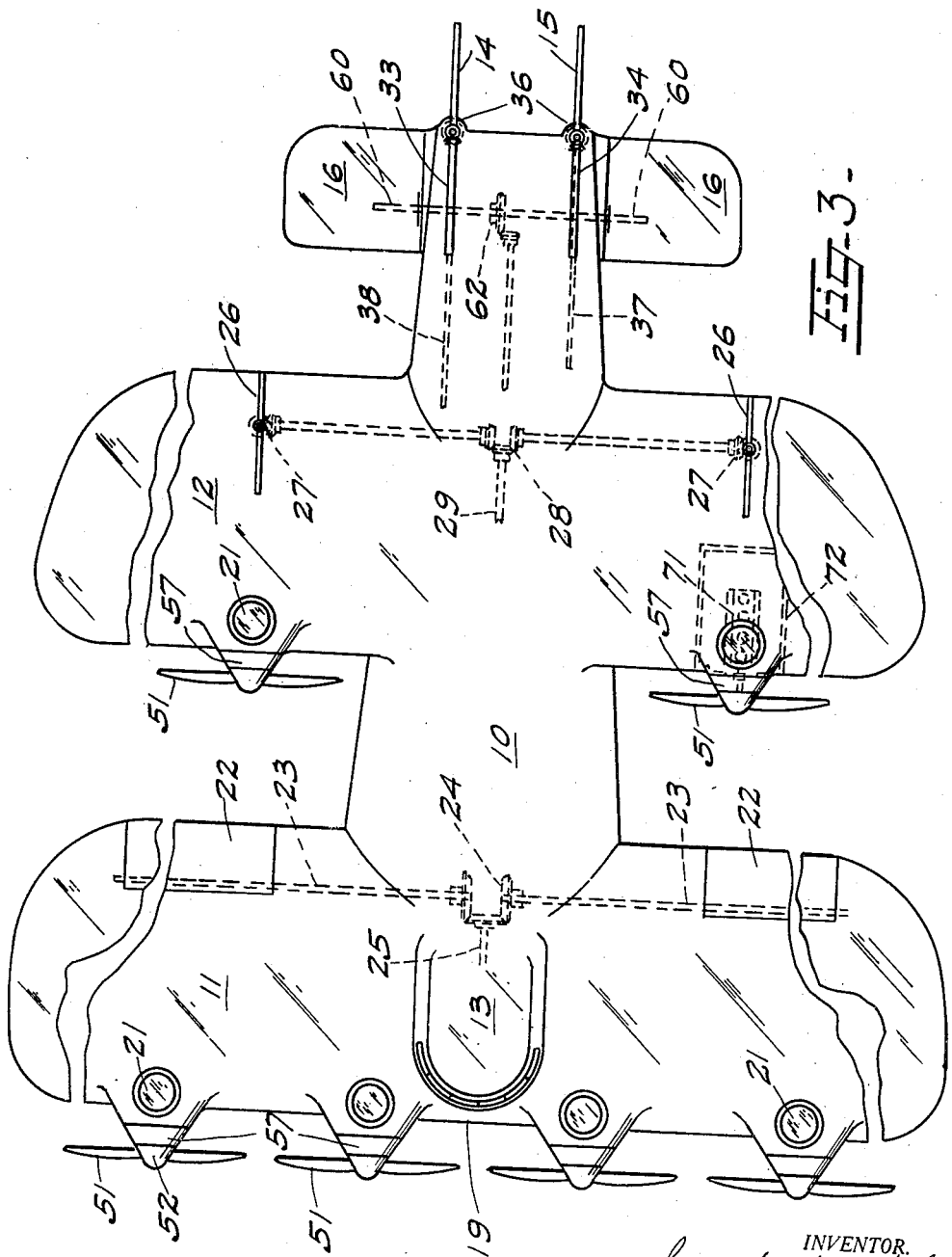

Patented June 7, 1932

1,861,491

UNITED STATES PATENT OFFICE

SOCRATIS H. CAPELIS, OF EL CERRITO, CALIFORNIA

AIRCRAFT

Application filed October 13, 1930. Serial No. 488,239.

This invention is for a tandem monoplane, and has special reference to an aircraft of the heavier than air type provided with two sets of wings in substantially the same plane.

The main object of the invention is to provide a monoplane with two sets of wings, one set being positioned rearwardly of and in spaced relation to the other set.

Another object of the invention is to mount the motors within the wing structure, and propellers at the forward edge of the wings and provide means for changing the angularity of the propeller relative to the wing.

Another object of the invention is to provide gear means for adjusting the ailerons, elevators and rudders and fluid operated means for extending and retracting the landing gear.

Other objects and advantages of the invention will become apparent as the following description is read on the drawings forming a part of this specification.

The invention consists primarily of a tandem monoplane with two pair of wings spacedly related in tanden relation, motors mounted in the wing structure, propellers mounted forwardly of the wings, the hubs being arcuately seated, the shaft being connected to the motor shaft by a universal coupling whereby the propellers may be adjusted to angular positions, the ailerons, rudders and elevators being operated through gearing, and a suitable landing gear.

The invention is adequately illustrated in the accompanying drawings in which

Fig. 1 is a side elevation of the invention;

Fig. 2 is a fragmentary sectional view through the propeller angularity adjusting mechanism;

Fig. 3 is a top plan view of the invention;

Fig. 4 is a front elevation showing the double wing structure and propeller arrangement; and Fig. 5 is a plan view of the main rudder control mechanism.

Similar reference characters are used to indicate similar parts throughout the several views.

A fuselage 10 is provided with a forward pair of wings 11 and a rearward pair 12, a pilot's cabin 13, and passenger cabins within the fuselage 10, a pair of rudders 14 and 15 and two pair of elevators 16 and 17, a tail skid 18 and landing gear 2. The fuselage is formed with a nose substantially formed by the forward edge of the forward wing 11 as indicated at 19, continuing downwardly and to the tail in stream-line to reduce air resistance, the bottom 20 of the fuselage being substantially wider than the upper portion to permit greater spread of the wheels and consequent stability of the craft in landing. The wings are self supporting, no struts being provided externally. The motors 71 are mounted in motor compartments 72 in the wings, the motor compartments having windows 21 mounted in the upper wing surface whereby ample light is admitted for inspection and care of the motors during daylight hours.

The forward wings are provided with ailerons 22 which are hinged on and fixed to shafts 23 which are rotated by means of bevel gearing 24 through the shaft 25 which is provided with a hand wheel, lever or other suitable operating means.

The rear wings 12 are provided with a pair of auxiliary rudders 26 which are operable from a single control through bevel gears 27 and suitable gearing 28, controlled by a shaft 29 which extends forwardly to the pilot's cabin 13. The pivot shaft 30 is fixed to rudder 26 and rotatably mounted in suitable bearings as at 31 fixed to the fin 32.

The main rudders 14 and 15 are pivotally connected to the fins 33 and 34 by shafts 35 fixed to the rudders 14 and 15 and operated through bevel gearing 36 and shafts 37 and 38 extending forwardly to the pilot's cabin 13 and there provided with operating means adapted to cause the rudders to work in parallelism or opposition, in parallelism for steering and opposition for braking, and may comprise any known system, one method being indicated in Fig. 6 in which the shaft 37 suitably supported in bearings, has rotatably mounted thereon a gear 39 meshing with a fixed gear 40 on shaft 38, and a sprocket 42 interconnected with a fixed sprocket 41 on shaft 38 by a chain 43, the gear 39 and sprocket 42 having clutch hubs 44 adapted to cooperate with the clutch 45 which is slidably and non-rotatably mounted on the shaft 37, the clutch being operated by means of a fork 46 fixed on a shaft 47 and retained in engagement normally with sprocket 42 by a compression spring 48 and shifted into engagement with gear 39 by means of the foot treadle 49, the device being operated by hand wheel 50. By this means, operation of hand wheel 50 causes both shafts 37 and 38 to turn in the same direction, being normally driven through the sprockets 42 and 41 and cooperating chain 43, swinging the rudders 14 and 15 in the same direction. By depressing the clutch pedal 49, clutch 45 is shifted into engagement with gear 39 which drives gear 40 thereby turning shafts 37 and 38 in opposite directions and causing the rudders 14 and 15 to work in opposition, and acting as a brake for the craft. Coincidently the rudders 26 may be used for steering, and may, if desired, be caused to operate coincidently by suitable gear connection between shafts 29 and 37.

The leading edge of the wings is made sufficiently high to permit mounting of the motors therein, as also allow repairs to be made while the craft is in flight, the motors being coupled to the propellers by means of a universal joint and an arcuately seated nose as indicated in Fig. 3, the propeller 51 being mounted in the usual hub 52 having a shaft 53 extending therefrom and coupled onto the motor shaft 54 by means of a universal coupling 55, the shaft 53 being rotatable in a bearing in the extension 56 which is integral with the arcuate seat thrust member 57, and pivoted in registry with the universal joint pivot center as indicated at 58, suitable gear means being provided at 59 for swinging the member 57 about the center 58, surfaced cooperating arcuate seats 59' providing a suitable support irrespective of the angularity of the propellers. The elevators 16 and 17 are mounted on shafts 60 and 61 and are also operable through gearing as indicated at 62 and controlled through shafts 63.

A suitable landing gear is provided.

Suitable windows and doors are provided and arranged in accordance with the interior arrangements of the fuselage.

The various parts and devices constituting the invention are adequately described and their operation fully explained in the foregoing and it is believed that further explanation is unnecessary, and it will be understood that variations in construction and arrangement of parts which are consistent with the appended claims may be resorted to without detracting from the spirit or scope of the invention or sacrificing any of the advantages thereof.

The invention described in the foregoing is an improvement over my Patent No. 1,745,600, issued February 4, 1930.

I claim:

1. A tandem monoplane comprising a fuselage provided with a plurality of wings in series and spacedly related, the forward wings having ailerons at the trailing edge thereof, power units mounted in said wings adjacent the leading edge, propellers driven by said power units and capable of being angularly adjusted relative to said power units.

2. An aircraft of the heavier-than-air type provided with a plurality of pairs of wings spacedly related and arranged in stepped tandem, motor compartments in said wings, propellers mounted adjacent the leading edge of said wings and driven by power units in said motor compartments, and means for varying the angular relation of said propellers relative to said wings.

3. An aircraft of the heavier-than-air type provided with a plurality of pairs of wings spacedly related and arranged in stepped tandem relation, motor compartments in said wings, propellers mounted at the leading edge of said wings and driven by power units within said motor compartments, means for varying the angular relation of said propellers relative to said wings, windows in the top surface of said wings for said motor compartments, and gear means for operating the ailerons, rudders and elevators of said aircraft.

4. An aircraft of the heavier-than-air type provided with a plurality of pairs of wings in tandem stepped relation, motors mounted in said wings, angularly adjustable propellers operated by said motors and gear means for operating the steering planes of said aircraft.

5. An aircraft provided with a plurality of pairs of wings arranged in stepped tandem, the propeller driving motors being mounted in compartments within the wing structures, the propellers being driven through a universal coupling and angularly adjustable during operation of said aircraft, and gear means for controlling the ailerons, rudders and elevators.

6. An aircraft having a plurality of pairs of wings arranged in stepped tandem, the leading edge of the leading wing forming the nose of the fuselage, angularly adjustable propellers mounted at the leading edge of said wings and operated by power units mounted within the wings and enclosed in individual compartments therein, ailerons at the trailing edge of the leading wings, auxiliary rudders mounted on the trailing wings, a pair of spacedly related rudders, and two pair of elevators in parallel, mounted at the tail end of said fuselage.

7. An aircraft provided with two pairs of wings arranged in tandem and spaced apart, the leading edge of the leading wing comprising the nose of the fuselage, motor compartments in said wings, propeller operating power units mounted in said motor compartments and driving propellers for said aircraft through universal joints, said propellers having shafts rotatably mounted in a swivel head having a center in registry with said universal joint, and means for adjusting said swivel head to change the angular relation of said propeller shaft relative to the power unit shaft.

8. An aircraft provided with two pairs of wings arranged in tandem and spaced apart, the leading edge of the leading wing comprising the nose of the fuselage, motor compartments within the wing structure having propeller operating motors mounted therein, propellers driven by said motors through universal joints, the propeller shafts being rotatably mounted in swivel heads pivotally mounted in registry with the pivot centers of said universal joints, means for adjusting said swivel heads about said pivotal mounting whereby the relative angularity of said propellers are varied.

9. An aircraft provided with two pairs of wings arranged in stepped tandem and spaced apart, the leading edge of the leading wing forming the nose of the fuselage, said fuselage continuing curvilinearly downward and backward, the lower portion of said fuselage being substantially wider than the upper portion, propeller operating motors mounted in individual compartments in said wings, propellers driven by said motors and having shafts rotatably mounted in swivel heads and driven through universal joints, said swivel heads being pivotally mounted in registry with said universal joints and arcuately seated, whereby said propellers may be angularly adjusted, gear means for adjusting said swivel heads, ailerons forming a portion of the trailing edge of the leading wings, an auxiliary rudder on each trailing wing adjacent the trailing edge, elevators pivotally mounted forward of the center thereof, a pair of spaced rudders at the tail of said fuselage and adapted to be coincidently adjusted in parallelism for steering, or in opposition for braking.

10. An aircraft provided with a plurality of pairs of wings in stepped tandem arrangement and spaced apart, propeller operating motors mounted in individual compartments formed within the wing structures, propellers driven by said motors, a pair of spaced rudders adapted to be coincidently adjusted in parallelism for steering, or coincidently adjusted in opposition for braking, a pair of auxiliary rudders mounted on the trailing wings.

In testimony whereof I have affixed my signature.

SOCRATIS H. CAPELIS.